(12) United States Patent
Meijer

(10) Patent No.: US 8,934,758 B2
(45) Date of Patent: Jan. 13, 2015

(54) METHODS AND APPARATUS FOR PRESENTING SUPPLEMENTAL CONTENT IN ASSOCIATION WITH RECORDED CONTENT

(75) Inventor: Johannes Meijer, Kharkiv (UA)

(73) Assignee: EchoStar Global B.V., Almelo (NL)

( * ) Notice: Subject to any disclaimer, the term of this patent is extended or adjusted under 35 U.S.C. 154(b) by 189 days.

(21) Appl. No.: 12/702,750

(22) Filed: Feb. 9, 2010

(65) Prior Publication Data

US 2011/0194838 A1   Aug. 11, 2011

(51) Int. Cl.
| | |
|---|---|
| H04N 9/80 | (2006.01) |
| H04N 5/76 | (2006.01) |
| H04N 5/445 | (2011.01) |
| H04N 5/765 | (2006.01) |
| H04N 21/4147 | (2011.01) |
| H04N 21/433 | (2011.01) |
| H04N 21/44 | (2011.01) |
| H04N 21/462 | (2011.01) |
| H04N 21/81 | (2011.01) |

(52) U.S. Cl.
CPC .............. *H04N 5/76* (2013.01); *H04N 5/445* (2013.01); *H04N 5/765* (2013.01); *H04N 21/4147* (2013.01); *H04N 21/4334* (2013.01); *H04N 21/44016* (2013.01); *H04N 21/4622* (2013.01); *H04N 21/812* (2013.01)
USPC .......................................... 386/249; 386/248

(58) Field of Classification Search
CPC ......... H04N 5/85; H04N 5/76; H04N 9/8042; H04N 21/812; H04N 60/59; H04N 5/782; G11B 27/105; G11B 27/28; G11B 2220/2562; G11B 27/024; G11B 27/329; G11B 2220/20; G11B 2220/90; G11B 27/34

USPC .......................................... 386/248–251, 299
See application file for complete search history.

(56) References Cited

U.S. PATENT DOCUMENTS

| | | | |
|---|---|---|---|
| 3,682,363 | A | 8/1972 | Hull |
| 3,919,479 | A | 11/1975 | Moon |
| 3,942,190 | A | 3/1976 | Detwiler |
| 4,224,481 | A | 9/1980 | Russell |
| 4,313,135 | A | 1/1982 | Cooper |
| 4,331,974 | A | 5/1982 | Cogswell et al. |

(Continued)

FOREIGN PATENT DOCUMENTS

| | | |
|---|---|---|
| EP | 521454 | 1/1993 |
| EP | 594241 | 4/1994 |

(Continued)

OTHER PUBLICATIONS

Invitation to Pay Fees and Partial Search Report dated May 16, 2011, PCT/EP20111051335, 7 pages.

(Continued)

*Primary Examiner* — Nigar Chowdhury
(74) *Attorney, Agent, or Firm* — Ingrassia Fisher & Lorenz, P.C.

(57) ABSTRACT

A digital video recorder is operable to receive and record an audio/video stream including a segment of a program and at least one first advertisement. The digital video recorder is then operable to identify a temporal location within the segment of the program for insertion of a second advertisement during playback of the recorded audio/video stream. The second advertisement is then inserted within the segment of the program during playback.

16 Claims, 5 Drawing Sheets

(56) References Cited

U.S. PATENT DOCUMENTS

| | | | |
|---|---|---|---|
| 4,388,659 | A | 6/1983 | Lemke |
| 4,404,589 | A | 9/1983 | Wright, Jr. |
| 4,408,309 | A | 10/1983 | Kiesling et al. |
| 4,439,785 | A | 3/1984 | Leonard |
| 4,450,531 | A | 5/1984 | Kenyon |
| 4,520,404 | A | 5/1985 | Von Kohorn |
| 4,602,297 | A | 7/1986 | Reese |
| 4,605,964 | A | 8/1986 | Chard |
| 4,633,331 | A | 12/1986 | McGrady et al. |
| 4,665,431 | A | 5/1987 | Cooper |
| 4,697,209 | A | 9/1987 | Kiewit |
| 4,706,121 | A | 11/1987 | Young |
| 4,739,398 | A | 4/1988 | Thomas |
| 4,750,213 | A | 6/1988 | Novak |
| 4,755,889 | A | 7/1988 | Schwartz |
| 4,760,442 | A | 7/1988 | O'Connell et al. |
| 4,761,694 | A | 8/1988 | Shudo et al. |
| 4,789,961 | A | 12/1988 | Tindall |
| 4,805,217 | A | 2/1989 | Morihiro et al. |
| 4,816,905 | A | 3/1989 | Tweedy et al. |
| 4,833,710 | A | 5/1989 | Hirashima |
| 4,876,670 | A | 10/1989 | Nakabayashi |
| 4,888,769 | A | 12/1989 | Deal |
| 4,891,715 | A | 1/1990 | Levy |
| 4,897,867 | A | 1/1990 | Foster et al. |
| 4,916,682 | A | 4/1990 | Tomoda et al. |
| 4,918,730 | A | 4/1990 | Schulze |
| 4,920,533 | A | 4/1990 | Dufresne et al. |
| 4,930,160 | A | 5/1990 | Vogel |
| 4,939,594 | A | 7/1990 | Moxon et al. |
| 4,947,244 | A | 8/1990 | Fenwick et al. |
| 4,949,169 | A | 8/1990 | Lumelsky et al. |
| 4,949,187 | A | 8/1990 | Cohen |
| 4,963,866 | A | 10/1990 | Duncan |
| 4,963,995 | A | 10/1990 | Lang |
| 4,972,190 | A | 11/1990 | Primeau et al. |
| 4,974,085 | A | 11/1990 | Campbell et al. |
| RE33,535 | E | 2/1991 | Cooper |
| 4,991,033 | A | 2/1991 | Takeshita |
| 5,014,125 | A | 5/1991 | Pocock et al. |
| 5,057,932 | A | 10/1991 | Lang |
| 5,063,453 | A | 11/1991 | Yoshimura et al. |
| 5,093,718 | A | 3/1992 | Hoarty et al. |
| 5,121,476 | A | 6/1992 | Yee |
| 5,126,852 | A | 6/1992 | Nishino et al. |
| 5,126,982 | A | 6/1992 | Yifrach |
| 5,130,792 | A | 7/1992 | Tindell et al. |
| 5,132,992 | A | 7/1992 | Yurt et al. |
| 5,134,499 | A | 7/1992 | Sata et al. |
| 5,168,353 | A | 12/1992 | Walker |
| 5,191,410 | A | 3/1993 | McCalley et al. |
| 5,202,761 | A | 4/1993 | Cooper |
| 5,227,876 | A | 7/1993 | Cucchi et al. |
| 5,233,423 | A | 8/1993 | Jernigan et al. |
| 5,241,428 | A | 8/1993 | Goldwasser et al. |
| 5,245,430 | A | 9/1993 | Nishimura |
| 5,247,347 | A | 9/1993 | Litteral et al. |
| 5,253,275 | A | 10/1993 | Yurt et al. |
| 5,311,423 | A | 5/1994 | Clark |
| 5,329,320 | A | 7/1994 | Yifrach |
| 5,333,091 | A | 7/1994 | Iggulden et al. |
| 5,357,276 | A | 10/1994 | Banker et al. |
| 5,361,261 | A | 11/1994 | Edem et al. |
| 5,371,551 | A | 12/1994 | Logan et al. |
| 5,412,416 | A | 5/1995 | Nemirofsky |
| 5,414,455 | A | 5/1995 | Hooper et al. |
| 5,434,678 | A | 7/1995 | Abecassis |
| 5,438,423 | A | 8/1995 | Lynch |
| 5,440,334 | A | 8/1995 | Walters et al. |
| 5,442,390 | A | 8/1995 | Hooper et al. |
| 5,442,455 | A | 8/1995 | Hioki et al. |
| 5,452,006 | A | 9/1995 | Auld |
| 5,453,790 | A | 9/1995 | Vermeulen et al. |
| 5,461,415 | A | 10/1995 | Wolf et al. |
| 5,461,428 | A | 10/1995 | Yoo |
| 5,477,263 | A | 12/1995 | O'Callaghan et al. |
| 5,481,542 | A | 1/1996 | Logston et al. |
| 5,508,940 | A | 4/1996 | Rossmer et al. |
| 5,513,011 | A | 4/1996 | Matsumoto et al. |
| 5,517,250 | A | 5/1996 | Hoogenboom et al. |
| 5,521,630 | A | 5/1996 | Chen et al. |
| 5,528,282 | A | 6/1996 | Voeten et al. |
| 5,533,021 | A | 7/1996 | Branstad et al. |
| 5,535,137 | A | 7/1996 | Rossmere et al. |
| 5,535,229 | A | 7/1996 | Hain, Jr. et al. |
| 5,537,408 | A | 7/1996 | Branstad et al. |
| 5,541,919 | A | 7/1996 | Young et al. |
| 5,550,594 | A | 8/1996 | Cooper et al. |
| 5,555,463 | A | 9/1996 | Staron et al. |
| 5,555,555 | A | 9/1996 | Sato et al. |
| 5,557,538 | A | 9/1996 | Retter et al. |
| 5,557,541 | A | 9/1996 | Schulhof et al. |
| 5,559,999 | A | 9/1996 | Maturi et al. |
| 5,563,714 | A | 10/1996 | Inoue et al. |
| 5,572,261 | A | 11/1996 | Cooper |
| 5,574,662 | A | 11/1996 | Windrem et al. |
| 5,581,479 | A | 12/1996 | McLaughlin et al. |
| 5,583,561 | A | 12/1996 | Baker et al. |
| 5,583,652 | A | 12/1996 | Ware |
| 5,586,264 | A | 12/1996 | Belknap et al. |
| 5,600,364 | A | 2/1997 | Hendricks et al. |
| 5,603,058 | A | 2/1997 | Belknap et al. |
| 5,604,544 | A | 2/1997 | Bertram |
| 5,610,653 | A | 3/1997 | Abecassis |
| 5,614,940 | A | 3/1997 | Cobbley |
| 5,619,337 | A | 4/1997 | Naimpally |
| 5,625,464 | A | 4/1997 | Compoint et al. |
| 5,629,732 | A | 5/1997 | Moskowitz et al. |
| 5,642,171 | A | 6/1997 | Baumgartner et al. |
| 5,648,824 | A | 7/1997 | Dunn |
| 5,659,539 | A | 8/1997 | Porter et al. |
| 5,664,044 | A | 9/1997 | Ware |
| 5,668,948 | A | 9/1997 | Belknap et al. |
| 5,675,388 | A | 10/1997 | Cooper |
| 5,682,488 | A | 10/1997 | Gleason et al. |
| 5,684,918 | A | 11/1997 | Abecassis |
| 5,692,093 | A | 11/1997 | Iggulden |
| 5,696,866 | A | 12/1997 | Iggulden |
| 5,696,868 | A | 12/1997 | Kim et al. |
| 5,696,869 | A | 12/1997 | Abecassis |
| 5,701,383 | A | 12/1997 | Russo et al. |
| 5,703,655 | A | 12/1997 | Corey |
| 5,706,388 | A | 1/1998 | Isaka |
| 5,712,976 | A | 1/1998 | Falcon, Jr. et al. |
| D390,839 | S | 2/1998 | Yamamoto et al. |
| 5,715,356 | A | 2/1998 | Hirayama et al. |
| 5,719,982 | A | 2/1998 | Kawamura et al. |
| 5,721,815 | A | 2/1998 | Ottesen et al. |
| 5,721,878 | A | 2/1998 | Ottesen et al. |
| D392,269 | S | 3/1998 | Mason et al. |
| 5,724,474 | A | 3/1998 | Oguro et al. |
| 5,742,730 | A | 4/1998 | Couts |
| 5,751,282 | A | 5/1998 | Girard et al. |
| 5,751,883 | A | 5/1998 | Ottesen et al. |
| 5,761,417 | A | 6/1998 | Henley et al. |
| 5,774,170 | A | 6/1998 | Hite et al. |
| 5,774,186 | A | 6/1998 | Brodsky |
| 5,778,137 | A | 7/1998 | Nielsen et al. |
| 5,805,763 | A | 9/1998 | Lawler et al. |
| 5,805,821 | A | 9/1998 | Saxena et al. |
| 5,808,607 | A | 9/1998 | Brady et al. |
| 5,815,689 | A | 9/1998 | Shaw et al. |
| 5,822,493 | A | 10/1998 | Uehara et al. |
| 5,848,217 | A | 12/1998 | Tsukagoshi et al. |
| 5,864,682 | A | 1/1999 | Porter et al. |
| 5,870,553 | A | 2/1999 | Shaw et al. |
| 5,889,915 | A | 3/1999 | Hewton |
| 5,892,536 | A | 4/1999 | Logan |
| 5,892,884 | A | 4/1999 | Sugiyama et al. |
| 5,899,578 | A | 5/1999 | Yanagihara et al. |
| 5,920,572 | A | 7/1999 | Washington et al. |
| 5,930,444 | A | 7/1999 | Camhi et al. |
| 5,930,493 | A | 7/1999 | Ottesen et al. |
| 5,949,954 | A | 9/1999 | Young et al. |

(56) References Cited

U.S. PATENT DOCUMENTS

| | | |
|---|---|---|
| 5,953,485 A | 9/1999 | Abecassis |
| 5,956,716 A | 9/1999 | Kenner et al. |
| 5,973,679 A | 10/1999 | Abbott et al. |
| 5,987,210 A | 11/1999 | Iggulden |
| 5,995,709 A | 11/1999 | Tsuge |
| 5,999,688 A | 12/1999 | Iggulden |
| 5,999,689 A | 12/1999 | Iggulden |
| 5,999,691 A | 12/1999 | Takagi et al. |
| 6,002,443 A | 12/1999 | Iggulden |
| 6,002,832 A | 12/1999 | Yoneda |
| 6,005,562 A | 12/1999 | Shiga et al. |
| 6,005,564 A | 12/1999 | Ahmad et al. |
| 6,005,603 A | 12/1999 | Flavin |
| 6,018,612 A | 1/2000 | Thomason et al. |
| 6,028,599 A | 2/2000 | Yuen et al. |
| 6,055,495 A | 4/2000 | Tucker et al. |
| D424,543 S | 5/2000 | Hodgson |
| 6,057,893 A | 5/2000 | Kojima et al. |
| D426,208 S | 6/2000 | Hodgson |
| D426,209 S | 6/2000 | Hodgson |
| 6,088,455 A | 7/2000 | Logan |
| 6,091,886 A | 7/2000 | Abecassis |
| RE36,801 E | 8/2000 | Logan et al. |
| 6,100,941 A | 8/2000 | Dimitrova et al. |
| 6,112,226 A | 8/2000 | Weaver et al. |
| 6,138,147 A | 10/2000 | Weaver et al. |
| 6,151,444 A | 11/2000 | Abecassis |
| 6,163,644 A | 12/2000 | Owashi et al. |
| 6,167,083 A | 12/2000 | Sporer et al. |
| 6,169,843 B1 | 1/2001 | Lenihan et al. |
| 6,192,189 B1 | 2/2001 | Fujinami et al. |
| 6,198,877 B1 | 3/2001 | Kawamura et al. |
| 6,208,804 B1 | 3/2001 | Ottesen et al. |
| 6,208,805 B1 | 3/2001 | Abecassis |
| 6,226,447 B1 | 5/2001 | Sasaki et al. |
| 6,232,926 B1 | 5/2001 | Nguyen et al. |
| 6,233,389 B1 | 5/2001 | Barton |
| 6,243,676 B1 | 6/2001 | Witteman |
| 6,278,837 B1 | 8/2001 | Yasukohchi et al. |
| 6,285,824 B1 | 9/2001 | Yanagihara et al. |
| 6,304,714 B1 | 10/2001 | Krause et al. |
| 6,330,675 B1 | 12/2001 | Wiser et al. |
| 6,335,730 B1 | 1/2002 | Gould |
| 6,341,195 B1 | 1/2002 | Mankovitz et al. |
| D454,574 S | 3/2002 | Wasko et al. |
| 6,400,407 B1 | 6/2002 | Zigmond et al. |
| 6,404,977 B1 | 6/2002 | Iggulden |
| 6,408,128 B1 | 6/2002 | Abecassis |
| 6,424,791 B1 | 7/2002 | Saib |
| 6,425,127 B1 | 7/2002 | Bates et al. |
| 6,445,738 B1 | 9/2002 | Zdepski et al. |
| 6,445,872 B1 | 9/2002 | Sano et al. |
| 6,452,615 B1 | 9/2002 | Chiu et al. |
| 6,490,000 B1 | 12/2002 | Schaefer et al. |
| 6,498,894 B2 | 12/2002 | Ito et al. |
| 6,504,990 B1 | 1/2003 | Abecassis |
| D470,153 S | 2/2003 | Billmaier et al. |
| 6,529,685 B2 | 3/2003 | Ottesen et al. |
| 6,542,695 B1 | 4/2003 | Akiba et al. |
| 6,553,178 B2 | 4/2003 | Abecassis |
| 6,574,594 B2 | 6/2003 | Pitman |
| 6,597,405 B1 | 7/2003 | Iggulden |
| 6,677,967 B2 | 1/2004 | Sawano et al. |
| 6,698,020 B1 | 2/2004 | Zigmond |
| 6,701,355 B1 | 3/2004 | Brandt et al. |
| 6,718,551 B1 | 4/2004 | Swix |
| 6,760,017 B1 | 7/2004 | Banerjee et al. |
| 6,771,316 B1 | 8/2004 | Iggulden |
| 6,788,882 B1 | 9/2004 | Geer et al. |
| D499,740 S | 12/2004 | Ombao et al. |
| 6,850,691 B1 | 2/2005 | Stam |
| 6,856,758 B2 | 2/2005 | Iggulden |
| 6,871,006 B1 | 3/2005 | Oguz et al. |
| 6,931,451 B1 | 8/2005 | Logan |
| 6,978,470 B2 | 12/2005 | Swix |
| 7,032,177 B2 | 4/2006 | Novak |
| 7,032,179 B2 | 4/2006 | Mack et al. |
| D521,521 S | 5/2006 | Jewitt et al. |
| 7,055,166 B1 | 5/2006 | Logan |
| 7,058,376 B2 | 6/2006 | Logan |
| 7,072,849 B1 | 7/2006 | Filepp et al. |
| 7,110,658 B1 | 9/2006 | Iggulden |
| 7,187,884 B2 | 3/2007 | Bardolatzy et al. |
| 7,197,758 B1 | 3/2007 | Blackketter |
| D539,809 S | 4/2007 | Totten et al. |
| 7,243,362 B2 | 7/2007 | Swix |
| 7,251,413 B2 | 7/2007 | Dow |
| 7,266,832 B2 | 9/2007 | Miller |
| 7,269,330 B1 | 9/2007 | Iggulden |
| 7,272,298 B1 | 9/2007 | Lang et al. |
| D554,140 S | 10/2007 | Armendariz |
| D558,220 S | 12/2007 | Maitlen et al. |
| 7,319,761 B2 | 1/2008 | Bianchi et al. |
| 7,320,137 B1 | 1/2008 | Novak |
| 7,376,469 B2 | 5/2008 | Eischeid et al. |
| 7,430,360 B2 | 9/2008 | Abecassis |
| D596,646 S | 7/2009 | Wani |
| D604,308 S | 11/2009 | Takano |
| 7,631,331 B2 | 12/2009 | Sie et al. |
| 7,634,785 B2 | 12/2009 | Smith |
| 7,661,121 B2 | 2/2010 | Smith |
| 7,801,910 B2 | 9/2010 | Houh et al. |
| 7,889,964 B1 | 2/2011 | Barton |
| 8,606,085 B2 | 12/2013 | Gratton |
| 2002/0088010 A1 | 7/2002 | Dudkiewicz et al. |
| 2002/0090198 A1 | 7/2002 | Rosenberg |
| 2002/0092017 A1 | 7/2002 | Klosterman |
| 2002/0092022 A1 | 7/2002 | Dudkicwicz |
| 2002/0097235 A1 | 7/2002 | Rosenberg |
| 2002/0120925 A1 | 8/2002 | Logan |
| 2002/0124249 A1 | 9/2002 | Shintani et al. |
| 2002/0131511 A1* | 9/2002 | Zenoni .............. 375/240.28 |
| 2002/0169540 A1 | 11/2002 | Engstrom |
| 2002/0184047 A1 | 12/2002 | Plotnick |
| 2003/0005052 A1 | 1/2003 | Feuer |
| 2003/0031455 A1 | 2/2003 | Sagar |
| 2003/0066078 A1 | 4/2003 | Bjorgan |
| 2003/0084451 A1 | 5/2003 | Pierzga |
| 2003/0093790 A1 | 5/2003 | Logan |
| 2003/0121037 A1 | 6/2003 | Swix et al. |
| 2003/0154128 A1 | 8/2003 | Liga |
| 2003/0192060 A1 | 10/2003 | Levy |
| 2003/0194213 A1 | 10/2003 | Schultz et al. |
| 2003/0202773 A1 | 10/2003 | Dow |
| 2003/0231854 A1 | 12/2003 | Derrenberger |
| 2004/0010807 A1 | 1/2004 | Urdang |
| 2004/0040042 A1 | 2/2004 | Feinleib |
| 2004/0049780 A1 | 3/2004 | Gee |
| 2004/0083484 A1 | 4/2004 | Ryal |
| 2004/0172650 A1 | 9/2004 | Hawkins et al. |
| 2004/0177317 A1 | 9/2004 | Bradstreet |
| 2004/0189873 A1 | 9/2004 | Konig |
| 2004/0190853 A1 | 9/2004 | Dow |
| 2004/0226035 A1 | 11/2004 | Hauser, Jr. |
| 2004/0244035 A1 | 12/2004 | Wright et al. |
| 2004/0255330 A1 | 12/2004 | Logan |
| 2004/0255334 A1 | 12/2004 | Logan |
| 2004/0255336 A1 | 12/2004 | Logan |
| 2005/0005308 A1 | 1/2005 | Logan |
| 2005/0020223 A1 | 1/2005 | Ellis et al. |
| 2005/0025469 A1 | 2/2005 | Geer et al. |
| 2005/0044561 A1 | 2/2005 | McDonald |
| 2005/0076359 A1 | 4/2005 | Pierson |
| 2005/0081252 A1 | 4/2005 | Chefalas |
| 2005/0132418 A1 | 6/2005 | Barton et al. |
| 2005/0262539 A1 | 11/2005 | Barton |
| 2006/0013555 A1* | 1/2006 | Poslinski .............. 386/46 |
| 2006/0015925 A1 | 1/2006 | Logan |
| 2006/0059426 A1 | 3/2006 | Ogikubo |
| 2006/0115058 A1 | 6/2006 | Alexander et al. |
| 2006/0143567 A1 | 6/2006 | Chiu et al. |
| 2006/0218617 A1 | 9/2006 | Bradstreet |
| 2006/0277564 A1 | 12/2006 | Jarman |
| 2006/0277569 A1 | 12/2006 | Smith |

(56) References Cited

U.S. PATENT DOCUMENTS

| | | | |
|---|---|---|---|
| 2006/0280437 A1 | 12/2006 | Logan | |
| 2006/0288374 A1 | 12/2006 | Ferris | |
| 2006/0288392 A1 | 12/2006 | Fleming | |
| 2007/0050827 A1 | 3/2007 | Gibbon | |
| 2007/0101394 A1 | 5/2007 | Fu et al. | |
| 2007/0113250 A1 | 5/2007 | Logan | |
| 2007/0118873 A1 | 5/2007 | Houh et al. | |
| 2007/0124758 A1 | 5/2007 | Sung | |
| 2007/0136742 A1 | 6/2007 | Sparrell | |
| 2007/0156739 A1 | 7/2007 | Black | |
| 2007/0168543 A1 | 7/2007 | Krikorian | |
| 2007/0199013 A1 | 8/2007 | Samari et al. | |
| 2007/0204288 A1 | 8/2007 | Candelore | |
| 2007/0214473 A1 | 9/2007 | Barton | |
| 2007/0276926 A1 | 11/2007 | LaJoie | |
| 2007/0300249 A1 | 12/2007 | Smith | |
| 2007/0300250 A1 | 12/2007 | Smith et al. | |
| 2007/0300258 A1 | 12/2007 | O'Connor | |
| 2008/0036917 A1 | 2/2008 | Pascarella | |
| 2008/0052739 A1 | 2/2008 | Logan | |
| 2008/0059997 A1* | 3/2008 | Plotnick et al. | 725/32 |
| 2008/0112690 A1 | 5/2008 | Shahraray | |
| 2008/0155627 A1 | 6/2008 | O'Connor | |
| 2008/0183587 A1* | 7/2008 | Joo et al. | 705/14 |
| 2008/0196060 A1 | 8/2008 | Varghese | |
| 2008/0250450 A1 | 10/2008 | Larner et al. | |
| 2008/0276266 A1 | 11/2008 | Huchital et al. | |
| 2009/0271826 A1 | 10/2009 | Lee et al. | |
| 2009/0299843 A1 | 12/2009 | Shkedi | |
| 2009/0304358 A1 | 12/2009 | Rashkovskiy | |
| 2010/0031162 A1 | 2/2010 | Wiser et al. | |
| 2010/0274628 A1* | 10/2010 | Kunz et al. | 705/10 |
| 2011/0194838 A1 | 8/2011 | Meijer | |
| 2011/0197224 A1 | 8/2011 | Meijer | |

FOREIGN PATENT DOCUMENTS

| | | |
|---|---|---|
| EP | 625858 | 11/1994 |
| EP | 645929 | 3/1995 |
| EP | 726574 | 8/1996 |
| EP | 785675 | 7/1997 |
| EP | 817483 | 1/1998 |
| EP | 1536362 | 6/2005 |
| EP | 1705908 | 9/2006 |
| EP | 2061239 A2 | 5/2009 |
| GB | 2222742 | 3/1990 |
| GB | 2320637 | 6/1998 |
| JP | 06-233234 | 8/1994 |
| JP | 06-245157 | 9/1994 |
| JP | 07-111629 | 4/1995 |
| JP | 07-131754 | 5/1995 |
| JP | 07-250305 | 9/1995 |
| JP | 07-264529 | 10/1995 |
| JP | 2001 359079 | 12/2001 |
| JP | 2003153114 | 5/2003 |
| JP | 2006 262057 | 9/2006 |
| JP | 2008 131150 | 6/2008 |
| WO | WO 92/22983 | 12/1992 |
| WO | WO 95/09509 | 4/1995 |
| WO | WO 95/32584 | 11/1995 |
| WO | WO 01/22729 | 3/2001 |
| WO | 0223903 A | 3/2002 |

OTHER PUBLICATIONS

International Search Report and Written Opinion dated Sep. 1, 2011, PCT/EP2011/051335, 17 pages.
Satterwhite, "Automatic Detection of TV Commercials," IEEE Potentials, Apr./May 2004. 4 pages.
Final Office Action dated Apr. 14, 2011, U.S. Appl. No. 12/130,792, 16 pages.
Final Office Action dated Apr. 27, 2011, U.S. Appl. No. 12/135,360, 22 pages.
Office Action dated Jun. 2, 2011, U.S. Appl. No. 11/942,111, 19 pages.
Office Action dated Jun. 7, 2011, U.S. Appl. No. 11/942,901, 22 pages.
Dimitrova, N., et al, "Real Time Commercial Detection Using MPEG Features", Philips Research.
"*Paramount Pictures Corp. v. ReplayTV & SonicBlue*", http://www.eff.org/IP/Video/Paramount v. ReplayTV/20011031_complaint.html, Complaint Filed, (Oct. 30, 2001).
Manjoo, Farhad, "They Know What You're Watching", Wired News, http://www.wired.com/news/politics/0.1283.52302.00.html, (May 2, 2002).
Haughey, Matt, "EFF's ReplayTV Suit Ends", http://www.pvrblog.com/pvr/2004/01/effs_replaytv_s.html, (Jan. 12, 2004).
Mizutani, Masami, et al, "Commercial Detection in Heterogeneous Video Streams Using Fused Multi-Modal and Temporal Features", IEEE ICASSP, 2005, Philadelphia, (Mar. 22, 2005).
Tew, Chris, "How MythTV Detects Commercials", http://www.pvrwire.com/2006/10/27/how-mythtv-detects-commercials/, (Oct. 27, 2006).
RCA, "RCA DRC8060N DVD Recorder", http://www.pricegrabber.com/rating_getprodrev.php/product_id=12462074/id, PriceGrabber.com, (Jan. 26, 2007).
"How to Write a New Method of Commercial Detection", MythTV, http://www.mythtv.org/wiki/index.php/How to Write a New Method of Commercial Detection, (Jan. 26, 2007).
"Comskip", http://www.kaashoek.com/comskip/, commercial detector, (Jan. 26, 2007).
Casagrande, Steven; U.S. Appl. No. 11/942,111, filed Nov. 19, 2007.
Hodge, Kenneth; U.S. Appl. No. 11/942,896, filed Nov. 20, 2007.
Casagrande, Steven; U.S. Appl. No. 11/942,901, filed Nov. 20, 2007.
OA mailed on May 24, 2010 for U.S. Appl. No. 11/942,896, filed Nov. 20, 2007 in the name of Hodge.
Gratton, Max; U.S. Appl. No. 12/052,623, filed Mar. 20, 2008.
Casagrande, Steven; U.S. Appl. No. 12/130,792, filed May 30, 2008.
Casagrande, Steven; U.S. Appl. No. 12/135,360, filed Jun. 9, 2008.
Casagrande, Steven; U.S. Appl. No. 12/434,742, filed May 4, 2009.
Casagrande, Steven; U.S. Appl. No. 12/434,751, filed May 4, 2009.
ISR for PCT/US2009/037183 mailed on Jul. 15, 2009.
Casagrande, Steven; U.S. Appl. No. 12/486,641, filed Jun. 17, 2009.
International Search Report for PCT/US2009/069019 mailed on Apr. 14, 2010.
International Search Report for PCT/US2010/038836 mailed on Oct. 1, 2010.
OA mailed on Oct. 27, 2010 for U.S. Appl. No. 12/130,792, filed May 30, 2008 in the name of Casagrande.
Final OA mailed on Nov. 16, 2010 for U.S. Appl. No. 11/942,896, filed Nov. 20, 2007 in the name of Hodge.
OA mailed on Nov. 29, 2010 for U.S. Appl. No. 12/135,360, filed Jun. 9, 2008 in the name of Casagrande.
USPTO "Notice of Allowance" dated Aug. 12, 2013 for U.S. Appl. No. 12/052,623.
European Patent Office "Examination Report" dated Aug. 16, 2013 for European Patent Application No. 09801627.2.
European Patent Office "Examination Report" dated Aug. 16, 2013 for European Patent Application No. 11152790.9.
European Patent Office "Examination Report" dated Aug. 21, 2013 for European Patent Application No. 10 732 771.0.
USPTO "Office Action" dated Sep. 4, 2013 for U.S. Appl. No. 13/407,955.
USPTO "Notice of Allowance" dated Sep. 13, 2013 for U.S. Appl. No. 12/434,746.
USPTO "Notice of Allowance" dated Feb. 1, 2013 for U.S. Appl. No. 12/434,751.
China State Intellectual Property Office "Office Action" dated Feb. 4, 2013 for Chinese Patent Appln. No. 200980109447.
USPTO "Final Office Action" dated Feb. 4, 2013 for U.S. Appl. No. 12/434,746.
USPTO "Final Office Action" dated Mar. 15, 2013 for U.S. Appl. No. 12/052,623.
USPTO "Notice of Allowance" dated Mar. 26, 2013 for U.S. Appl. No. 12/486,641.

(56) References Cited

OTHER PUBLICATIONS

USPTO "Final Office Action" dated Mar. 28, 2013 for U.S. Appl. No. 12/135,360.
USPTO "Non-Final Office Action" mailed Oct. 16, 2012 for U.S. Appl. No. 12/486,641, filed Jun. 17, 2009.
China State Intellectual Property Office "Office Action" mailed Sep. 24, 2012 for China Appln. No. 200980109447.X.
Pogue, David "Networks Start to Offer TV on the Web" The New York Times, Oct. 18, 2007; retrieved from the internet at http://www.nytimes.com/007/10/18/technology/circuits/18pogue.html?pagewanted=print on Aug. 1, 2012.
TIVO "TIVO Launches Remote Scheduling With Verizon Wireless," Mar. 14, 2007.
Associated Press "AT&T Lets Mobile Phones Control Your Television," Mar. 6, 2007.
Canadian Intellectual Property Office "Office Action" dated Dec. 5, 2012 for Canadian Patent Appln. No. 2,665,855.
USPTO "Final Office Action" mailed Oct. 17, 2012 for U.S. Appl. No. 12/703,049, filed Dec. 9, 2010.
USPTO "Final Office Action" mailed Jan. 24, 2013 for U.S. Appl. No. 12/486,641, filed Jun. 17, 2009.
USPTO "Notice of Allowance" mailed Jan. 18, 2013 for U.S. Appl. No. 12/434,742, filed May 4, 2009.
Japan Patent Office "Notice of Rejection Ground" mailed Sep. 4, 2012 for Japanese Patent Appln. No. 2011-500879.
Canadian Patent Office "Office Action" mailed Jul. 23, 2012 for Canadian Patent Appln. No. 2,717,933.
USPTO "Non-Final Office Action" mailed Sep. 6, 2012 for U.S. Appl. No. 12/135,360, filed Jun. 9, 2008.
USPTO "Non-Final Office Action" mailed Sep. 25, 2012 for U.S. Appl. No. 12/052,623, filed Mar. 20, 2008.
Australian Patent Office "Patent Examination Report No. 2" mailed Jul. 12, 2012 for AU Patent Appln. 2009225834.
USPTO "Final Office Action" mailed Aug. 1, 2012 for U.S. Appl. No. 12/434,751, filed May 4, 2009.
USPTO "Final Office Action" mailed Jul. 19, 2012 for U.S. Appl. No. 12/434,742, filed May 4, 2009.
USPTO, "Non-Final Office Action" mailed Jun. 4, 2014 for U.S. Appl. No. 13/294,818.
Intellectual Property Corporation of Malaysia, "Substantive Examination Adverse Report" dated May 15, 2014 for Malaysia Patent Application No. PI 2010004195.
USPTO, "Non-Final Office Action" dated Apr. 2, 2012 for U.S. Appl. No. 12/703,049.
USPTO, "Non-Final Office Action" dated Apr. 23, 2014 for U.S. Appl. No. 12/703,049.
USPTO, "Non-Final Office Action" dated May 22, 2014 for U.S. Appl. No. 13/294,800.

\* cited by examiner

METHODS AND APPARATUS FOR PRESENTING SUPPLEMENTAL CONTENT IN ASSOCIATION WITH RECORDED CONTENT

BACKGROUND

Digital video recorders (DVRs) allow users to store television programs, movies and other content for archival and subsequent viewing. Often, users utilize a DVR to skip through advertisements and other portions of recorded content that they do not desire to view. When the user skips through the advertisements, the advertiser loses out on the value of the advertisement, because the user does not see the advertising message conveyed therein. Thus, it would be desirable for broadcasters, content providers and advertisers to utilize alternative advertising opportunities in audio/video content besides original advertisements included within the broadcast content.

BRIEF DESCRIPTION OF THE DRAWINGS

The same number represents the same element or same type of element in all drawings.

DETAILED DESCRIPTION OF THE DRAWINGS

Figure 1:
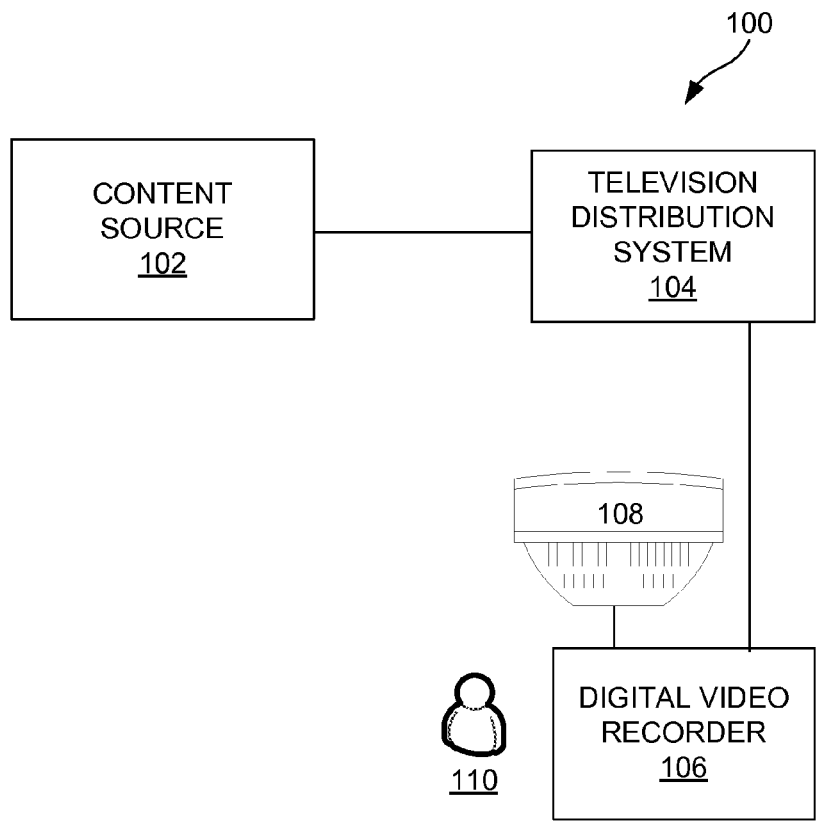
FIG. 1 illustrates an embodiment of a communication network.

The various embodiments described herein generally provide apparatus, systems and methods which facilitate the reception, processing, and outputting of audio/video (A/V) content. More particularly, described herein are techniques for presenting supplemental content in association with recorded content. For example, supplemental content, such as supplemental advertisements, may be inserted into various locations within a recorded audio/video stream during output to a presentation device. In short, described herein are systems, methods and apparatus for inserting advertisements and other content into a recorded audio/video stream during output.

In at least one embodiment, an audio/video stream to be received, processed, outputted and/or communicated may come in any format of audio/video content. Exemplary audio/video stream formats include Motion Picture Experts Group (MPEG) standards, Flash, Windows Media and the like. It is to be appreciated that the audio/video stream may be supplied by any source, such as an over-the-air (OTA) broadcast, a satellite or cable television distribution system, an internet protocol television (IPTV) distribution system, a digital video disk (DVD) or other optical disk, the internet or other communication networks and the like. While the techniques illustrated herein are described in the context of an audio/video stream, it is to be appreciated that the techniques may also be applied to the processing and output of other types of media content, such as audio streams or video streams.

At least one embodiment provides a method of presenting recorded content. The method includes receiving an audio/video stream at a DVR or other type of receiving device. The audio/video stream includes at least one segment of a program, having a beginning temporal location and an ending temporal location and at least one first advertisement temporally adjacent to the beginning temporal location or the ending temporal location of the segment. The method further includes recording the audio/video stream onto a storage medium associated with the DVR and receiving a request to playback the audio/video stream. Responsive to the request, the method includes identifying an intermediate temporal location in the audio/video stream, associated with the segment of the program, for insertion of a second advertisement. The intermediate temporal location is positioned in the audio/video stream between the beginning temporal location and the ending temporal location. The method further includes receiving the second advertisement, either as a file download, a streaming video or another broadcasted or transmitted audio/video stream. Responsive to the request, the method includes outputting the segment of the program, between the beginning temporal location and the intermediate temporal location, for presentation by a presentation device. The method further includes outputting the second advertisement, following the intermediate temporal location, for presentation by the presentation device and outputting the segment of the program, between the intermediate temporal location and the ending temporal location, for presentation by the presentation device.

The advertisements or supplemental content to be output by the DVR in association with the audio/video content may be selected based on various criteria. In at least one embodiment, content may be selected based on time of day of playback of the audio/video content. For example, an advertisement for a breakfast restaurant may be output if the audio/video content is played back in the morning, whereas an advertisement for a dinner restaurant may be output if the audio/video content is played back in the evening.

In at least one embodiment, advertisements to be output by the DVR may be selected based on non-television communications associated with a user of the DVR. For example, an examination of a user's e-mail, electronic invoices or internet browsing history may be utilized to select targeted advertisements for output by the DVR.

At least one embodiment provides a server which is operable to process a user's non-television communications to identify advertisements for output by the DVR. The server includes a communication interface that receives non-television electronic communications, associated with a user, from at least one external device, such as a computer, mobile telephone, e-mail server, web server or the like. The server also includes a storage medium that stores metadata regarding a plurality of television advertisements. The server further includes control logic operable to process the non-television electronic communications and the metadata to select at least one of the plurality of television advertisements for presentation in association with an audio/video stream on a DVR. The control logic is further operable to generate a message, instructing the DVR to present the selected advertisement in association with the audio/video stream and initiate transmission of the message, via the communication interface, to the DVR.

FIG. 1 illustrates an embodiment of a communication network 100. The communication network includes a content source 102, a television distribution system 104, a DVR 106 and a presentation device 108. Each of these components will be discussed in greater detail below. The communication network 100 may include other components, elements or devices not illustrated for the sake of brevity.

The content source 102 is operable for receiving, generating and communicating content to one or more DVRs 106. The content to be received, processed, outputted and/or communicated may come in any of various forms including, but not limited to, audio, video, audio/video, data, information, or otherwise. In at least one embodiment, the content source 102 is operable for receiving various forms and types of content from other sources, aggregating the content and transmitting the content to the DVR 106 through the television distribution system 104. It is to be appreciated that the content source 102 may receive practically any form and/or type of information from one or more sources including streaming television programming, recorded audio or video content, electronic programming guide data and the like.

The television distribution system 104 is operable to transmit content from the content source 102 to the DVR 106. The television distribution system 104 may comprise any type of wired (e.g., cable and fiber) and/or wireless (e.g., cellular, satellite, microwave, and other types of radio frequency) communication medium and any desired network topology (or topologies when multiple mediums are utilized). Exemplary television distribution systems 104 include terrestrial, cable, satellite and internet protocol television (IPTV) distribution systems. In at least one embodiment, the television distribution system 104 broadcasts or multicasts content to a plurality of television receivers, e.g., the DVR 106. The television distribution system 104 may also distribute content to a specific addressable television receiver, e.g., the DVR 106, such as video-on-demand content and the like. In at least one embodiment, the content source 102 may be embodied as a transmission facility of the television distribution system 104. Exemplary content sources 102 include over-the-air (OTA) terrestrial transmission facilities, cable television distribution head-ends, satellite television uplink centers, broadband or internet servers and the like.

The DVR 106 is operable to receive content from the television distribution system 104 and store the received content for subsequent presentation to the user 110. The DVR 106 is further operable to output the received and/or stored content for presentation by the presentation device 108. In at least one embodiment, the presentation device 108 is a display device (e.g., a television) configured to display content to a user 110. The DVR 106 may receive an audio/video stream in any format (e.g., analog or digital format), and store and output the audio/video stream for presentation by the presentation device 108. In at least one embodiment, the DVR 106 may be integrated with a television receiver, such as a satellite, cable, over-the-air, broadband or other type of television receiver that receives and demodulates television signals that are output for display on a display device (e.g., a television). As used herein, a television receiver or DVR may also be referred to as a set-top box, which is a television receiver that is located externally with respect to a display device. The DVR 106 may be further configured to output menus and other information that allow a user 110 to control the output of audio/video content by the DVR 106, view electronic programming guides (EPGs), set recording timers and the like. In some embodiments, the DVR 106 and the presentation device 108 may be integrated as a device combining the functionality of a display device and television receiver/DVR or the like.

The presentation device 108 may be any device configured to receive an audio, video or audio/video stream from the DVR 106 and present the content to a user 110. Examples of the presentation device 108 include a television, a video monitor or similar device, audio receiver or the like capable of presenting audio and/or video content to the user 110. The DVR 106 may be communicatively coupled to the presentation device 108 through any type of wired or wireless connection. Exemplary wired connections include coax, fiber, composite video and high-definition multimedia interface (HDMI). Exemplary wireless connections include WiFi, ultra-wide band (UWB) and Bluetooth.

Responsive to particular recording timers, the DVR 106 coordinates the reception of audio, audio/video or video signals associated with a program through a communication interface, such as a network interface or television receiving resource (e.g., a television tuner) and storage of the video signal onto a storage medium (e.g., a hard drive or Flash memory) for subsequent playback. The DVR 106 may also record content currently being broadcast responsive to input from the user 110 (e.g., the user 110 presses a record button while watching television). The DVR 106 may include any number of television receiving resources utilized for receiving television programs or other types of content. A DVR 106 minimally includes at least one television receiving resource to receive and record audio/video signals associated with a television program. The DVR 106 may include multiple television receiving resources to record multiple television programs simultaneously. For example, the DVR 106 may include two or more tuners that allow recording and/or viewing of multiple programs though the DVR 106 simultaneously. In at least one embodiment, the DVR 106 may include multiple types of television receiving resources, such as an over-the-air (OTA) tuner and a satellite, cable and/or internet protocol television tuner that may be utilized to receive and/or record programs from multiple transmission sources.

The DVR 106 is also operable to receive supplemental content, e.g., advertisements and other messages, for presentation in association with a recorded audio/video stream. For example, the DVR 106 may receive and store supplemental content from the television distribution system 104 for subsequent output in association with other recorded content. In at least one embodiment, the television distribution system 104 pushes particular advertisements to the DVR 106 periodically for playback with recorded content. The advertisements may be intended for presentation generally with any kind of content or may alternatively be intended for presentation with any specific instances of content recorded by the DVR 106. For example, the DVR 106 may receive a plurality of advertisements from the television distribution system 104 and may store the advertisements related to content recorded thereupon, while discarding the remaining advertisements associated with content not recorded by the DVR 106. Supplemental content may be received and stored by the DVR 106 before, simultaneously or after reception of a television program for which the supplemental content will be output in association therewith.

In another embodiment, the DVR 106 may receive supplemental content on a discrete communication network (not shown in FIG. 1) from the television distribution system 104. For example, the DVR 106 may download supplemental content from the internet or other communication network over a local or wide area network while receiving content from a distinct television distribution system, such as a satellite television broadcast system. Such content may be pushed to the DVR 106 or may be requested by the DVR 106 depending on content recorded thereupon. For example, the DVR 106 may record a particular television program and then download from a server supplemental content associated with the program for playback in association with the program. The DVR 106 may also receive the supplemental content in a streaming fashion during playback of the content as described in further detail below.

Responsive to a request to playback content, the DVR 106 outputs the audio/video stream to the presentation device 108 for presentation to a user 110. The DVR 106 is further operable to identify a location within the audio/video stream for insertion of the supplemental content. The DVR 106 may identify any location in an audio/video stream for insertion of the supplemental content during playback, depending on desired design criteria, such as the beginning of the audio/video stream (e.g., pre-roll), the ending of the audio/video stream (e.g., post-roll) or inserted at specific locations (e.g., insertion at original advertising breaks, replacement of advertisements or other content or insertion at other logical locations). In at least one embodiment, the DVR 106 identifies a location for insertion of the supplemental content based on metadata associated with the audio/video stream or the supplemental content.

For example, the audio/video stream may include markers or other identifying information that specifies locations for insertion of supplemental content within the audio/video stream. In another embodiment, the DVR 106 may receive data separate from the audio/video stream that specifies the insertion location of the supplemental content. For example, the insertion location information may be received in association with the supplemental content or separate from the supplemental content. The DVR 106 then operates to output the supplemental content at the identified temporal location within the audio/video stream.

Figure 2:
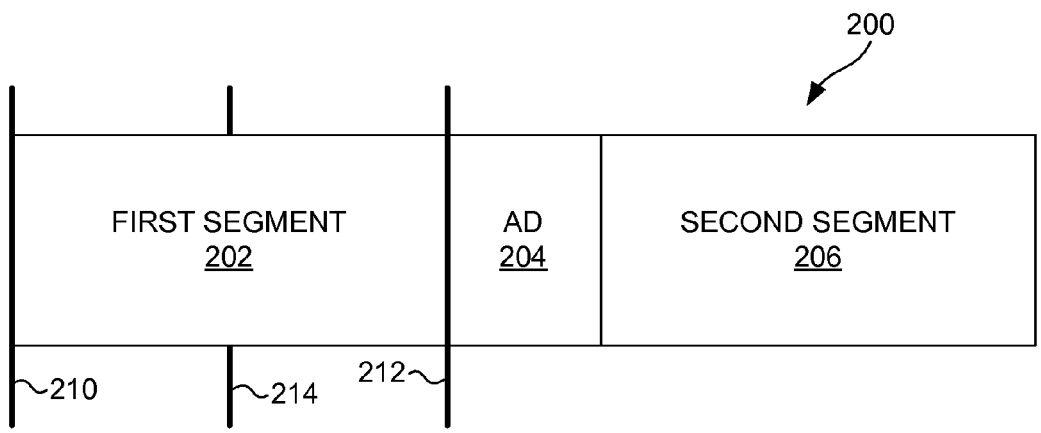
FIG. 2 illustrates an embodiment of an input audio/video stream received by the DVR.

FIG. 2 illustrates an embodiment of an input audio/video stream 200 received by the DVR 106 from the television distribution system 104. As illustrated in FIG. 2, the input audio/video stream 200 includes a first segment 202 of a program, an original advertisement 204 and a second segment 206 of the program. The first segment 202 includes a beginning temporal location 210 and an ending temporal location 212.

The DVR 106 operates to identify an intermediate temporal location 214 for insertion of the supplemental content. The first segment 202 may then be divided into discrete portions of content. The first portion includes the content between the beginning temporal location 210 and the intermediate temporal location 214. The second portion includes the content between the intermediate temporal location 214 and the ending temporal location 212. During output, the supplemental content is then inserted at the intermediate temporal location 214.

Figure 3:
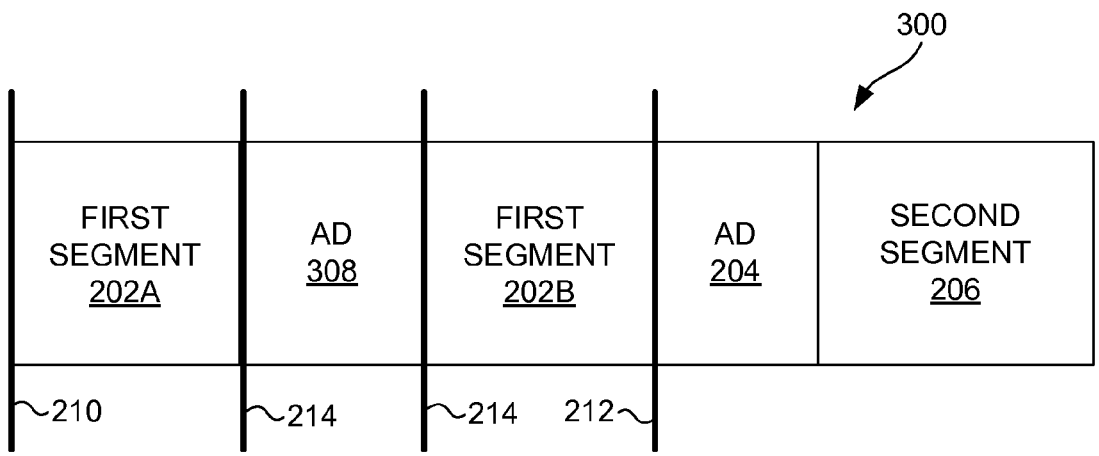
FIG. 3 illustrates an embodiment of an audio/video stream output by the DVR in accordance with the techniques described herein.

FIG. 3 illustrates an embodiment of an output audio/video stream 300 output by the DVR 106 in accordance with the techniques described herein. As illustrated in the output audio/video stream 300, the DVR 106 operates to output the first segment 202A between the beginning temporal location 210 and the intermediate temporal location 214. The DVR 106 then operates to output a supplemental advertisement 308 for presentation by the presentation device 108. Following the supplemental advertisement 308, the DVR 106 operates to output the remaining portion of the first segment 202B between the intermediate temporal location 214 and the ending temporal location 212. Other content, such as the original advertisement 204 and the second segment 206 may also be output by the DVR 106.

Thus, the DVR 106 operates to output other advertisements or content during playback of a recorded audio/video stream. In at least one embodiment, the DVR 106 may disable a trick play mode function during output of the supplemental advertisement 308. This allows an advertiser to capture the attention of the user 110 during playback of the recorded audio/video stream 200 at a different time than the original advertisement break and further avoids the problem of the user 110 skipping over advertising material during playback of the audio/video stream 200.

Figure 4:
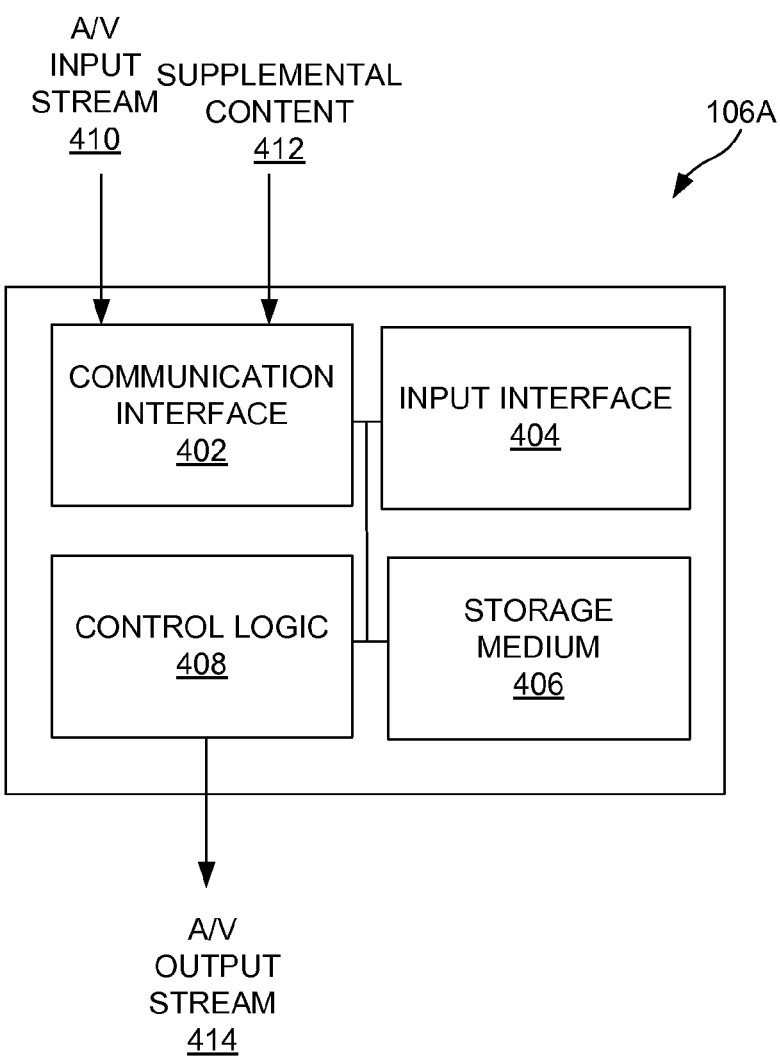
FIG. 4 illustrates an embodiment of a DVR of FIG. 1.

FIG. 4 illustrates an embodiment of a DVR of FIG. 1. FIG. 4 will be discussed in reference to the communication network 100 illustrated in FIG. 1. The DVR 106A includes a communication interface 402, an input interface 404, a storage medium 406 and control logic 408. Each of these components will be discussed in greater detail below. The DVR 106A may include other elements, components or devices which are not illustrated for the sake of brevity.

The communication interface 402 is operable to receive an audio/video input stream 410 from the television distribution system 104. More particularly, in at least one embodiment, the communication interface 402 receives and tunes a television signal including television programming. The communication interface 402 may receive an over-the-air (OTA) broadcast, a direct broadcast satellite signal, a cable television signal or an internet protocol television (IPTV) signal and tune the audio/video input stream 410 to extract the selected television programming. In at least one embodiment, the communication interface 402 may include multiple tuners, utilized by the DVR 106A to output and/or record multiple television programs simultaneously.

The communication interface 402 is further operable to receive supplemental content 412 from an external source. For example, the communication interface 402 may receive the supplemental content 412 from either the content source 102 via the television distribution system 104 or from a server via a separate communication network (e.g., via the internet, local area network (LAN) or wide area network (WAN), not shown in FIGS. 1-4). In at least one embodiment, the communication interface 402 may include a network interface, such as a WiFi transceiver or Ethernet interface for communication with a communication network other than the television distribution system 104. Furthermore, the communication interface 402 may include any number of discrete communication interfaces to exchange data with external sources, such as the television distribution system 104 and a server (not shown in FIGS. 1-4). For example, the communication interface 402 may include a satellite television tuner to receive content from a satellite television distribution network and may include a network interface to receive content from a discrete data communication network, such as a local area network (LAN) or wide area network (WAN).

The input interface 404 is operable to wirelessly receive data from a remote control or other input device (not shown in FIGS. 1-4). The input interface 404 may communicate with a remote control utilizing any type of IR and/or RF communication link. In at least one embodiment, the input interface 404 receives a key code from a remote control and responsively provides the key code to the control logic 408 for processing. The data received from the remote control may be utilized by the control logic 408 to control the output of content by the control logic 408. Some of the data received by the input interface 404 may request to view electronic programming guide data, menus and the like.

The storage medium 406 is operable to persistently store video signals recorded by the DVR 106A. The storage medium 406 may comprise any type of non-volatile memory appropriate for storing video signals recorded by the DVR 106A. Exemplary storage mediums 406 include hard drives (e.g., magnetic memory), flash memory, battery backed up memory and the like. In at least one embodiment, the storage medium 406 may be internally located within the DVR 106A.

In other embodiments, the storage medium 406 may be located external with respect to the DVR 106A. The DVR 106A may also utilize a combination of internal and external storage mediums 406 for storage of video signals.

The control logic 408 is operable to control the operation of the DVR 106A and output of content therefrom. The control logic 408 may be a single processing device or a plurality of processing devices that cooperatively operate to control the operation of the DVR 106A. The control logic 408 may include various components or modules for processing and outputting audio/video content. Exemplary components or modules for processing audio/video content include a demodulator, a decoder, a decompressor, a conditional access module and a transcoder module.

The control logic 408 coordinates storage of the audio/video input stream 410 onto the storage medium 406. More particularly, the control logic 408 operates responsive to recording timers configured on the DVR 106A or other input (either supplied by a user or content provider) to command the communication interface 402 to receive content from a specified channel and coordinate storage of the content onto the storage medium 406.

In at least one embodiment, the control logic 408 is operable to generate an audio/video output stream 414 based on the audio/video input stream 410, e.g., pass through the signal for display by an associated presentation device 108. The control logic 408 is also operable to retrieve stored video content from the storage medium 406 to generate an audio/video output stream 414 for display by the presentation device 108. As described above, the control logic 408 is operable to identify a location within the audio/video input stream 410 for insertion of the supplemental content 412 during output of the audio/video output stream 414. The presentation device 108 then presents the audio/video output stream 414 to the user 110. The control logic 408 may incorporate circuitry to output audio/video streams in any format recognizable by the presentation device 108, including composite video, component video, Digital Visual Interface (DVI), High-Definition Multimedia Interface (HDMI), 1394 and WiFi The control logic 408 may also incorporate circuitry to support multiple types of these or other audio/video formats. In at least one embodiment, as described above, the DVR 106A may be integrated with the presentation device 108, and the control logic 408 may be operable to control the presentation of the audio/video output stream 414 by the presentation device 108.

Figure 5:
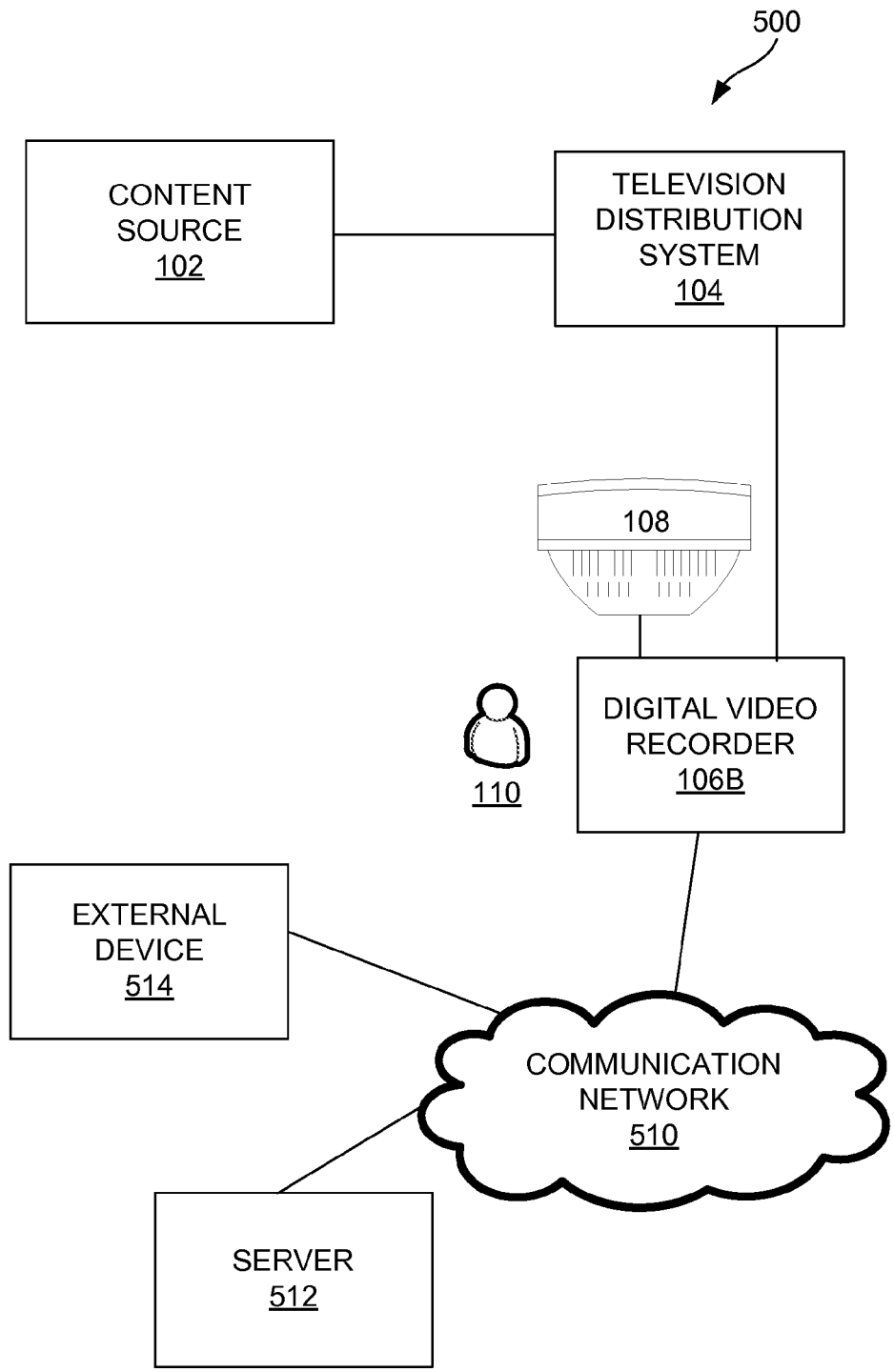
FIG. 5 illustrates an embodiment of another communication system.

As described above, a DVR may receive supplemental content from a source distinct from a television distribution system. FIG. 5 illustrates an embodiment of another communication system 500. The communication system 500 includes a content source 102, a television distribution system 104, a DVR 106B, a presentation device 108, a communication network 510, a server 512 and an external device 514. Each of these components is discussed in greater detail below and the discussion of components common to FIGS. 1-4 is omitted for the sake of brevity. Furthermore, the communication system 500 may include other components, elements or devices not illustrated for the sake of brevity.

The DVR 106B is operable to receive audio/video content from the television distribution system 104 and record the audio/video content for subsequent playback. The DVR 106B is further communicatively coupled to the server 512 via the communication network 510. The communication network 510 may comprise any type of communication network, such as the internet, a local area network (LAN) or a wide area network (WAN). The DVR 106B receives supplemental content from the server 512 and operates to insert the supplemental content into temporal locations within recorded audio/video content.

In at least one embodiment, the server 512 operates to periodically transmit supplemental content, such as advertisements, to the DVR 106B for insertion into audio/video content. As described above, the DVR 106B identifies a location within an audio/video stream to insert the supplemental content during playback. In at least one embodiment, the DVR 106B may periodically receive advertisements for insertion into audio/video content from the server 512. For example, the DVR 106B may receive a plurality of advertisements for insertion into audio/video streams during playback. The DVR 106B may then select one of the advertisements for insertion into an audio/video stream during playback at an appropriate location.

For example, the DVR 106B may receive multiple advertisements related to restaurants. Each advertisement may be related to a particular type of cuisine (e.g., Italian, Mexican or Greek). The DVR 106B may then operate to select one of the advertisements for insertion during playback of recorded content based on the content of the programming. For example, if the user 110 is watching content about Italy, then they may be presented with an advertisement for Italian food. Likewise, if the user is watching football, then they may be presented with an advertisement for a sports bar. Advertisements may also be selected for output based on a time of day. For example, in the morning, the DVR 106B may output an advertisement for a pancake restaurant, whereas in the evening, an advertisement for a pizza restaurant may be output.

Advertisements may also be selected for output based on demographics of the user 110. For example, if the user 110 is a child, then advertisements for toys may be selected for output by the DVR 106B. Likewise, if the user 110 is an adult male, then advertisements for automobiles may be selected for output by the DVR 106B. The DVR 106B may utilize any appropriate mechanism for identifying a user 110, such as manual login techniques, biometric identification, separate input devices for each user or the like. In at least one embodiment, the DVR 106B may identify the user 110 based on the time of day that the content is being watched or the content being watched based on various heuristic rules. For example, the DVR 106B may identify that children are watching content because it is the middle of the day and the user 110 is watching cartoons. Likewise, the DVR 106B may identify that an adult male is watching the content because it is late at night and the user 110 is watching sports.

In at least one embodiment, during playback of recorded content, the DVR 106B may query the server 512 to provide advertisements for output by the DVR 106B. The server 512 may then transmit the advertisement to the DVR 106B prior to output or the DVR 106B may receive the advertisement as streaming audio/video content that is substantially simultaneously output to the presentation device 108 for presentation to the user 110. For example, the DVR 106B may transmit a request to the server 512 for the advertisement and may receive the second advertisement as streaming audio/video content and output the streaming audio/video content for presentation by the presentation device 106B.

In at least one embodiment, the server 512 selects advertisements for output by the DVR 106B based on processing of non-television electronic communications received from an external device 514. The external device 514 may be any type of device capable of providing non-television electronic communications to the server 512 for processing. For example, the external device 514 may be a computer, mobile telephone, email server, web server or the like that processes non-television electronic communications related to the user 110.

In at least one embodiment, the external device 514 comprises a computer that receives emails and web pages related to data viewed by the user 110. The computer may then transmit such data or a summary thereof to the server 512 for processing. The server 512 then selects appropriate advertisements for output by the DVR 106B. For example, if the user 110 utilizes the external device 514 to view web pages related to a particular product, then the server 512 may select advertisements related to the product or a competing product and transmit the advertisements to the DVR 106B for output in association with a recorded audio/video stream.

In at least one embodiment, the external device 514 comprises an email server that transmits the user's 110 e-mail to the server 512 for processing. The server 512 then processes the e-mails to select appropriate advertising for output by the DVR 106B. In at least one embodiment, the server 512 may process electronic invoices related to the user 110 to select appropriate advertising for output by the DVR 106B. For example, the server 512 may process a mobile telephone bill of the user 110 and responsively select an advertisement related to a competitor of the mobile telephone provider for output to the user 110. The advertisement is then transmitted to the DVR 106B for output in association with video content.

Figure 6:
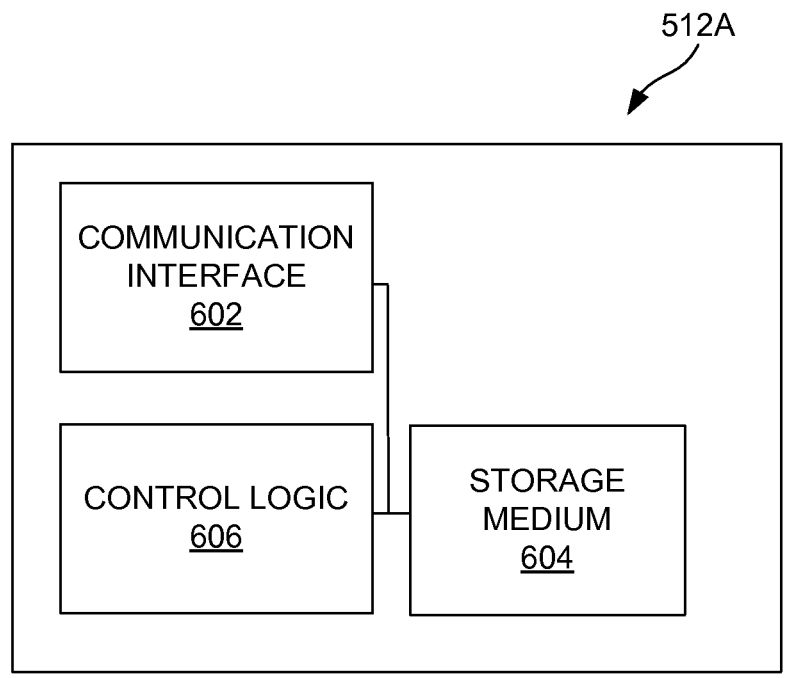
FIG. 6 illustrates an embodiment of the server of FIG. 5.

FIG. 6 illustrates an embodiment of the server of FIG. 5. The server 512A includes a communication interface 602, a storage medium 604 and control logic 606. Each of these components is discussed in greater detail below. The server 512A will be described in reference to the communication system 500 illustrated in FIG. 5. The server 512A may include other components not illustrated for the sake of brevity.

The communication interface 602 is operable to receive non-television electronic communications from the external device 514 (see FIG. 5). More particularly, in at least one embodiment, the communication interface 602 receives the non-television electronic communications from the external device 514 via the communication network 510. The communication interface 602 is also operable to communicate data to the DVR 106B via the communication network 510, such as metadata specifying advertisements for output by the DVR 106B and/or the advertisements for output by the DVR 106B. In at least one embodiment, the communication interface 602 may be communicatively coupled to the external device 514 and the DVR 106B through distinct communication networks.

The storage medium 604 is operable to store metadata regarding supplemental content, such as advertisements for output by the DVR 106B. For example, the storage medium 604 may store metadata describing various advertisements and the programs for which the advertisements will be output in association therewith by the DVR 106B. In at least one embodiment, the storage medium 604 may store various criteria associated with the advertisements specifying that conditions in which the DVR 106B will output the advertisements in association with other content. For example, display criteria may include time of day, user demographic information, content topic and the like. The control logic 606 utilizes the criteria to instruct the DVR 106B to output various advertisements for presentation to the user 110. The storage medium 604 may also store the advertisements which are transmitted to the DVR 106B through the communication network 510.

The control logic 606 is operable to control the operation of the server 512A. More particularly, the control logic 606 is operable to process non-television electronic communications received from the external device 514 and select advertisements or other supplemental content for output by the DVR 106B. The control logic 606 may be a single processing device or a plurality of processing devices that cooperatively operate to control the operation of the server 512A.

In at least one embodiment, the control logic 606 processes e-mails received from the external device 514 to identify advertisements for output by the DVR 106B. The control logic 606 then generates a message for transmission to the DVR 106B via the communication interface 602 specifying the criteria for display of a particular advertisement. For example, the advertisement may specify a particular product that the user 110 may be interested in based on their hobbies/interests or the like. The DVR 106B may be instructed to output the advertisement during a particular program. For example, an advertisement for a new toy may be output during playback of a cartoon (e.g., when a child is most likely watching the content), but may not be output during playback of a basketball game, when the user 110 is more likely an adult.

In at least one embodiment, the control logic 606 may identify multiple advertisements and transmit a message to the DVR 106B specifying the display criteria. For example, the message may specify multiple restaurants and the DVR 106B may output one of the advertisements based on the criteria at a specific time of the day (e.g., dinner time).

In at least one embodiment, the control logic 606 processes electronic invoices of the user 110 and selects advertisements related to specific products for the DVR 106B to output in association with other content. For example, the control logic 606 may process a mobile telephone bill of the user 110 and select an advertisement for a competing telephone provider for output by the DVR 106B. The DVR 106B may then output the advertisement at an appropriate time (e.g., when the user's 110 mobile telephone bill becomes due).

Examples of other types of data that may be processed by the control logic 606 to select advertisements include web browsing history, social network information, instant messages, web searches, purchasing histories and the like. It is to be appreciated that the control logic 606 may apply any type of heuristic rules for processing of non-television electronic communications for selection of advertisements by the DVR 106B, depending on desired design criteria. In at least one embodiment, the control logic 606 may process known profile information (e.g., income information) with other data (e.g., web browsing history) to select appropriate advertisements for output by the DVR 106B. For example, if the user 110 has been browsing the web for a new automobile, then the control logic 606 may select advertisements for automobiles that are within the user's 110 price range based on their income. Thus, the user 110 will not be presented with an advertisement for a luxury automobile if they cannot afford the automobile. Rather, the user 110 will be presented with an advertisement for a more price appropriate automobile within their likely price range. In at least one embodiment, the user 110 may opt into such a targeting program, allowing the server 512A access to their personal information (e.g., e-mails, web browsing history, financial records and the like).

Figure 7:
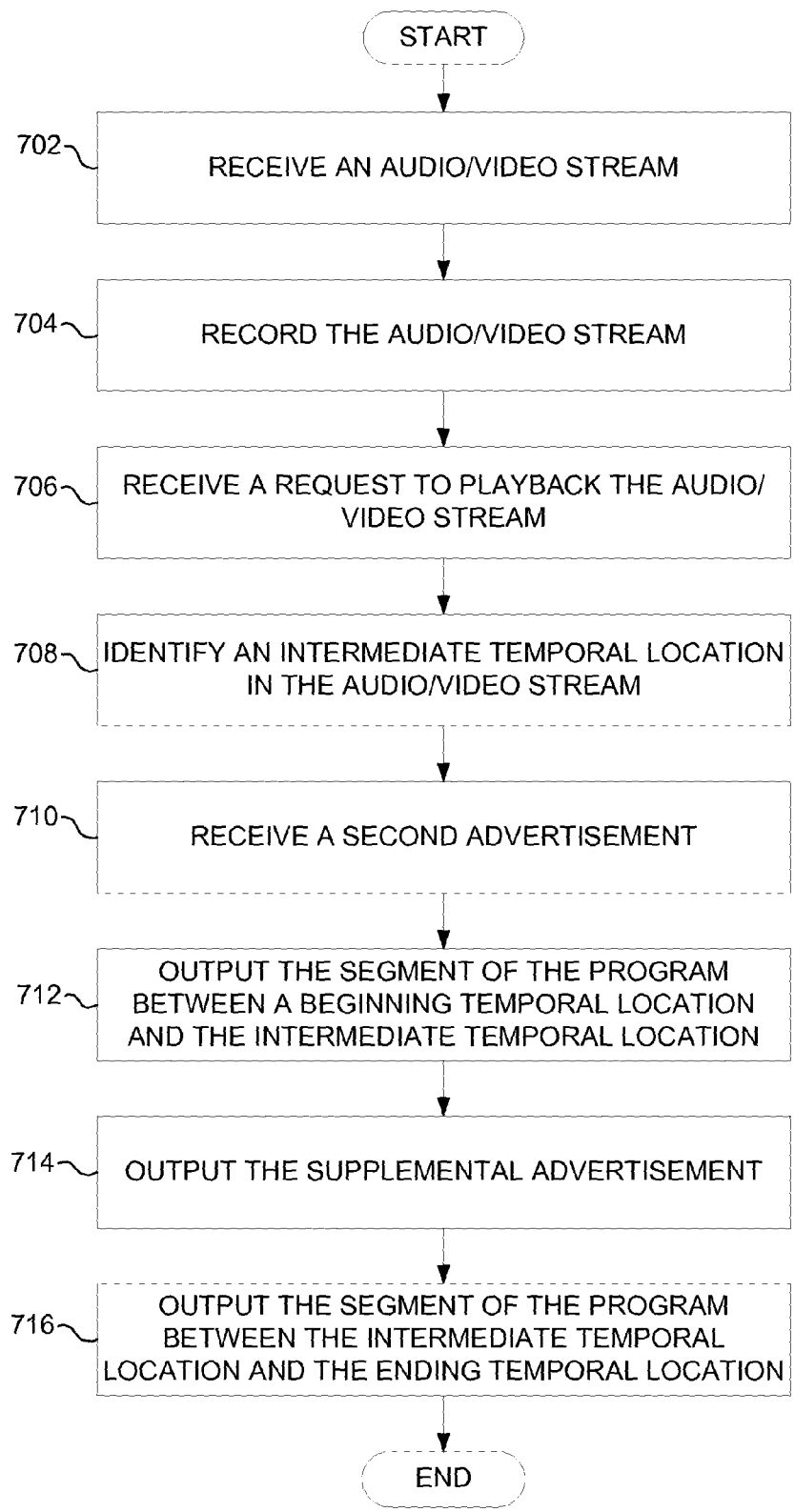
FIG. 7 illustrates an embodiment of a process for presenting a recorded audio/video stream.

FIG. 7 illustrates an embodiment of a process for presenting a recorded audio/video stream. More particularly, the process of FIG. 7 is directed at inserting advertisements within recorded audio/video content. The process of FIG. 7 may include other operations not illustrated for the sake of brevity.

The method includes receiving an audio/video stream using a communication interface of a DVR (operation 702). The audio/video stream includes at least one segment of a program, having a beginning temporal location and an ending temporal location and at least one first advertisement temporally adjacent to the beginning temporal location or the ending temporal location of the segment. The process further includes recording the audio/video stream onto a storage medium associated with the DVR (operation 704).

The process further includes receiving a request to playback the audio/video stream (operation 706). The process further includes identifying an intermediate temporal location in the audio/video stream, associated with the segment of the program, for insertion of a second advertisement (operation 708). The intermediate temporal location is positioned in the audio/video stream between the beginning temporal location and the ending temporal location.

The process further includes receiving the second advertisement (operation 710). The second advertisement may be received before, after or simultaneously with the request to playback the content. In at least one embodiment, the DVR may receive the second advertisement prior to receiving the audio/video stream in operation 702.

Responsive to the request, the process further includes outputting the segment of the program, between the beginning temporal location and the intermediate temporal location, for presentation by a presentation device (operation 712). The process further includes outputting the second advertisement, following the intermediate temporal location, for presentation by the presentation device (operation 714). In at least one embodiment, a DVR may disable a trick play mode function (e.g., fast forward, reverse, skip ahead or the like) during output of the second advertisement. Following the output of the second advertisement, the process includes outputting the segment of the program, between the intermediate temporal location and the ending temporal location, for presentation by the presentation device (operation 716).

Although specific embodiments were described herein, the scope of the invention is not limited to those specific embodiments. The scope of the invention is defined by the following claims and any equivalents therein.

What is claimed is:

1. A method of presenting recorded content, the method comprising:
   receiving an audio/video stream using a communication interface of a digital video recorder, the audio/video stream including at least one segment of a program, having a beginning temporal location and an ending temporal location and at least one first advertisement temporally adjacent to the beginning temporal location or the ending temporal location of the segment;
   recording the audio/video stream onto a storage medium associated with the digital video recorder;
   periodically receiving supplemental advertisements from a television distribution system, the received supplemental advertisements intended for presentation with recorded audio/video streams;
   the digital video recorder storing received supplemental advertisements related to content of the recorded audio/video stream, and discarding received supplemental advertisements associated with content not recorded by the digital video recorder;
   receiving a request to playback the audio/video stream;
   identifying an intermediate temporal location in the audio/video stream, associated with the segment of the program, for insertion of a second advertisement, the intermediate temporal location positioned in the audio/video stream between the beginning temporal location and the ending temporal location;
   receiving the second advertisement, the second advertisement selected based at least on an examination of email content contained in user email sent by a user of the digital video recorder via at least one non-television electronic communication from at least one electronic device that is external to the digital video recorder, wherein content of the selected second advertisement is determined by the examined email content;
   outputting the segment of the program, between the beginning temporal location and the intermediate temporal location, for presentation by a presentation device, responsive to the request;
   outputting the second advertisement, following the intermediate temporal location, for presentation by the presentation device; and
   outputting the segment of the program, between the intermediate temporal location and the ending temporal location, for presentation by the presentation device.

2. The method of claim 1, wherein outputting the second advertisement further comprises:
   disabling a trick play mode function of the digital video recorder during output of the second advertisement.

3. The method of claim 1, wherein receiving the second advertisement further comprises:
   receiving the second advertisement, prior to reception of the request to playback the audio/video stream; and
   storing the second advertisement on the storage medium for subsequent output.

4. The method of claim 1, wherein receiving the second advertisement further comprises:
   transmitting a request to a server, for the second advertisement; and
   receiving the second advertisement in a streaming transmission, from the server.

5. The method of claim 1, wherein identifying the intermediate temporal location in the audio/video stream further comprises:
   receiving metadata, associated with the audio/video stream, specifying the intermediate temporal location.

6. The method of claim 5, further comprising:
   selecting the second advertisement, from a plurality of advertisements, for presentation at the intermediate temporal location.

7. The method of claim 6, further comprising:
   receiving the plurality of advertisements, prior to reception of the request to playback the audio/video stream; and
   storing the plurality of advertisements on the storage medium for subsequent output.

8. The method of claim 6, wherein selecting the second advertisement further comprises:
   selecting the second advertisement, based at least on a time of day.

9. A digital video recorder comprising:
   a communication interface that receives an audio/video stream, the audio/video stream including at least one segment of a program, having a beginning temporal location and an ending temporal location and at least one first advertisement temporally adjacent to the beginning temporal location or the ending temporal location of the segment;
   a storage medium; and
   control logic operable to:
   coordinate storage of the audio/video stream onto the storage medium;
   receive a request to playback the audio/video stream;
   periodically receive supplemental advertisements from a television distribution system, the received supplemental advertisements intended for presentation with recorded audio/video streams;

store received supplemental advertisements related to content of the stored audio/video stream, and discard received supplemental advertisements associated with content not recorded by the digital video receiver;

identify an intermediate temporal location in the audio/video stream, associated with the segment of the program, for insertion of a second advertisement, the intermediate temporal location positioned in the audio/video stream between the beginning temporal location and the ending temporal location, the second advertisement selected based on an examination of email content contained in user email sent by a user of the digital video recorder via at least one non-television electronic communication from at least one electronic device that is external to the digital video recorder, wherein content of the second advertisement is determined by the examined email content;

output the segment of the program, between the beginning temporal location and the intermediate temporal location, for presentation by a presentation device, responsive to the request;

output the second advertisement, following the intermediate temporal location, for presentation by the presentation device; and output the segment of the program, between the intermediate temporal location and the ending temporal location, for presentation by the presentation device.

10. The digital video recorder of claim 9, wherein the control logic is operable to disable a trick play mode function of the digital video recorder during output of the second advertisement.

11. The digital video recorder of claim 9, wherein the control logic is operable to receive the second advertisement, prior to reception of the request to playback the audio/video stream and coordinate storage of the second advertisement on the storage medium for subsequent output.

12. The digital video recorder of claim 9, wherein the control logic is operable to transmit a request to a server, for the second advertisement and receive the second advertisement in a streaming transmission, from the server.

13. The digital video recorder of claim 9, wherein the control logic is operable to receive metadata, associated with the audio/video stream, specifying the intermediate temporal location.

14. The digital video recorder of claim 13, wherein the control logic is operable to select the second advertisement, from a plurality of advertisements, for presentation at the intermediate temporal location.

15. The digital video recorder of claim 14, wherein the control logic is operable to receive the plurality of advertisements, prior to reception of the request to playback the audio/video stream and coordinate storage of the plurality of advertisements on the storage medium for subsequent output.

16. The digital video recorder of claim 14, wherein the control logic is operable to select the advertisement, based at least on a time of day.

* * * * *